Sheet 1-2 Sheets.

J. Ladd,
Pegging Machine,

Nº 25,422. Patented Sep. 13, 1859.

Witnesses.
F. P. Hale Jr.
Arthur Neill.

Inventor.
Jesse Ladd.

Sheet 2-2 Sheets.

J. Ladd,

Pegging Machine,

Nº 25,422. Patented Sep. 13, 1859.

Witnesses.
F. P. Hall
Arthur Neill.

Inventor:
Jesse Ladd.

UNITED STATES PATENT OFFICE.

JESSE LADD, OF HOLDERNESS, NEW HAMPSHIRE.

MACHINE FOR ARRANGING PEGS.

Specification of Letters Patent No. 25,422, dated September 13, 1859.

*To all whom it may concern:*

Be it known that I, JESSE LADD, of Holderness, in the county of Grafton and State of New Hampshire, have invented a new and useful Machine for Arranging Pegs for Being Driven into the Sole of a Boot or Shoe; and I do hereby declare that the same is fully described and represented in the following specification and the accompanying drawings, of which—

Figure 1 exhibits a top view; Fig. 2, a side elevation; Fig. 3, a central, longitudinal, and vertical section, and Fig. 4, a rear elevation of it.

Such other drawings or figures as may be necessary to the proper delineation of the said machine will be hereinafter referred to and particularly described.

The nature of my invention consists in a combination of the following devices, or their mechanical equivalents, that is to say, first, a grooved cylinder furnished with a hopper or other proper means for supplying it with pegs. Second, a guiding receiver. Third, a series or one or more advancers and mechanism for operating them in manner as hereinafter described. Fourth, a device for discharging from the guiding receiver the refuse pegs or those whose points may not stand in advance of their butts. Fifth, certain springs or devices for preventing the discharge of the pegs from the guiding receiver into the receiving spout when the pegs are disposed in the former with their butts in advance of their points. Sixth, a receiving spout. Seventh, a peg carrier, and eighth, mechanism for advancing the pegs through the carrier.

My invention further consists in combining therewith or with the hopper and grooved cylinder an agitator. Also, in combining with the machine or its receiving spout a mechanism for insuring the fall or descent of the pegs therein. Also, in combining with the machine or its receiving spout, and peg carrier, a discharging door or its equivalent to operate as hereinafter described. Also, in combining with the machine or its receiving spout a mechanism or device for discharging the surplus pegs from such spout after it may have become sufficiently supplied therewith. Also, in combining with the machine or its receiving spout M a finger or mechanism for lifting from the lowermost peg thereof, preparatory to its being moved into the carrier, that peg which may be immediately over the said lowermost peg.

In the drawings, A exhibits the frame for supporting the operative parts of the mechanism and also the hopper B, for receiving the pegs, which are to be thrown promiscuously into such hopper. From the lower part of the hopper a conductor or spout C, extends toward and against or nearly against a grooved cylinder, D, a side view of which is represented in Fig. 5, it being therein shown as formed with grooves $a$, $a$, extending around it and for the purpose of receiving the pegs and causing them to stand at right angles to the axis of the cylinder. Furthermore, between each two grooves, the cylinder is furnished with a series of studs $b$, $b$, $b$, projecting regularly from it and serving to operate or trip an agitator or plate E arranged in the receiving spout C, of the hopper as shown in Fig. 3. The said grooved cylinder D, is to be revolved with an intermittent rotary movement, the same being effected by means of an impelling pawl $c$, acting against a ratchet $d$, affixed to one end of the cylinder, the lower end of the impelling pawl being jointed to a lever $e$, that rests upon the periphery of a cam $f$, which is fastened upon the driving shaft F. Fig. 6 exhibits a side view of the said cam, the lever and the pawl together with the mechanism by the side of the said lever and employed for operating the advancers to be hereinafter described. This figure also shows the receptacle T for refuse pegs. A spring $g$ (see Fig. 6) serves to maintain the lever $e$, in contact with the cam $f$ and as a matter of course to depress the said lever and the impelling pawl $c$. Furthermore, a spring $h$, applied to the lever $e$, operates to force the impelling pawl $c$ against the ratchet.

Figure 1:
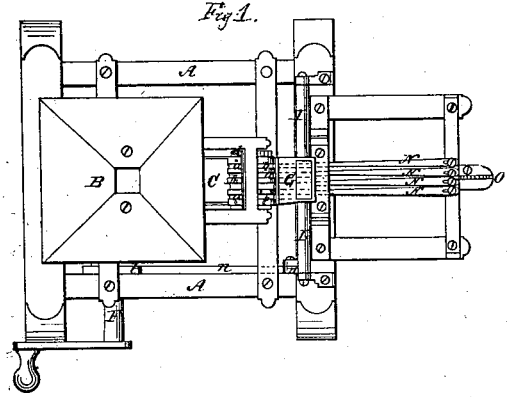
Figure 4:
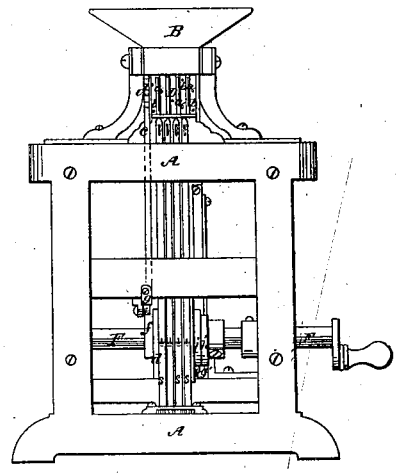
Figure 2:
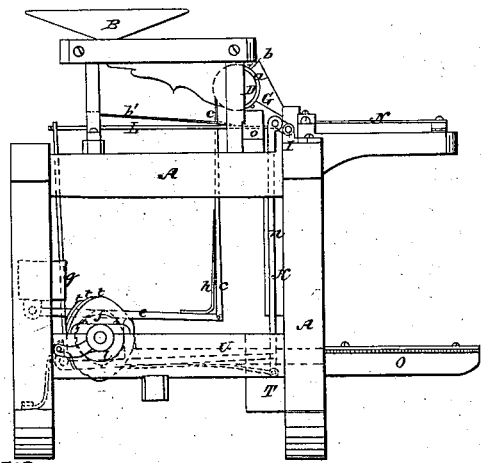
Figure 3:
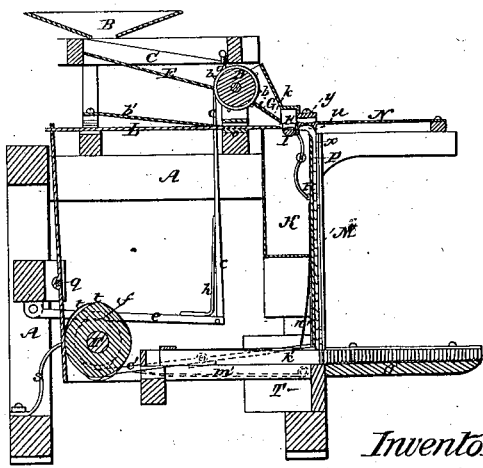
Figure 5:
Figure 7:
Fig. 7 represents a transverse section of the bottom of the chute G, its grooves being represented at $i$, $i$.
Figure 10:
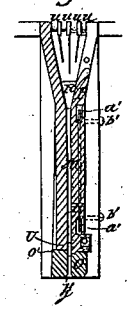
Figure 13:
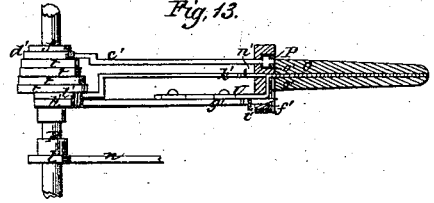
Figure 14:
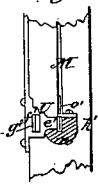
Figure 15:
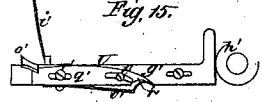
Figure 11:
Figure 16:
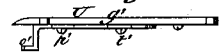
Figure 12:
Figure 6:
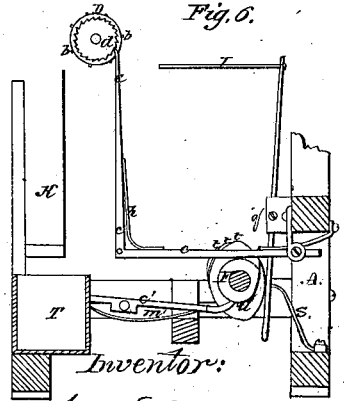
Figure 8:
Fig. 8 is a top view, and Fig. 9 a longitudinal section of the guiding receiver, H and its carrying shaft I. The said guiding receiver is a block of metal affixed to a horizontal shaft I, and having grooves $k$, $k$, $k$.
Figure 9:

In front of the grooved cylinder D there is a chute G or conductor having straight grooves in its bottom corresponding in number with the grooves of the cylinder and arranged so as to lead the pegs therefrom down toward and upon the guiding receiver H, arranged as shown in Fig. 3.